US007203226B1

(12) United States Patent
Rabipour et al.

(10) Patent No.: US 7,203,226 B1
(45) Date of Patent: Apr. 10, 2007

(54) METHODS AND APPARATUS FOR DATA COMMUNICATION

(75) Inventors: Rafi Rabipour, Côte S-Luc (CA); David Brombal, Plano, TX (US); Chung Cheung C. Chu, Brossard (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 780 days.

(21) Appl. No.: 10/293,613

(22) Filed: Nov. 14, 2002

(51) Int. Cl.
*H04L 5/16* (2006.01)
*H04B 1/38* (2006.01)

(52) U.S. Cl. ..................................... 375/222; 375/220
(58) Field of Classification Search ................. 375/222, 375/220; 370/466, 401; 704/219
See application file for complete search history.

(56) References Cited

U.S. PATENT DOCUMENTS

| | | | |
|---|---|---|---|
| 5,995,923 A * | 11/1999 | Mermelstein et al. ....... | 704/219 |
| 6,185,424 B1 | 2/2001 | Pon et al. | |
| 6,256,612 B1 | 7/2001 | Vo et al. | |
| 6,272,358 B1 | 8/2001 | Brent et al. | |
| 6,324,515 B1 | 11/2001 | Rabipour et al. | |
| 6,574,469 B1 | 6/2003 | Xiang et al. | |
| 2002/0054571 A1 | 5/2002 | Falsafi | |
| 2003/0123466 A1* | 7/2003 | Somekh et al. ............. | 370/401 |
| 2004/0037314 A1* | 2/2004 | Spear ........................ | 370/466 |

FOREIGN PATENT DOCUMENTS

EP  0 907 280 A2   4/1999
EP  1 076 466 A1   2/2001

OTHER PUBLICATIONS

3GPP TR 25.953 V4.0.0 (Mar. 2001) ;3rd Generation Partnership Project; Technical Specification Group (TSG) RAN3; Transcoder Free Operation (Release 4).
3GPP TS 23.153 V4.4.0 (Dec. 2001); 3rd Generation Partnership Project; Technical Specification Group Core Network; Out of Band Transcoder Control—Stage 2; (Release 4).
3GPP TS 23.205 V4.4.0 (Mar. 2002); 3rd Generation Partnership Project; Technical Specification Group Core Network; Bearer-independant circuit-switched core network; Stage 2 (Release 4).

(Continued)

*Primary Examiner*—Phuong Phu

(57) ABSTRACT

A communication apparatus having a communication interface for communicating with a first remote entity, the first remote entity including a decoder capable of decoding data encoded according to a first encoding format. The communication apparatus includes a control entity operative to detect an attempt by a second remote entity to establish a TFO connection with the communication apparatus via the communication interface, for sending to the first remote entity, via the communication apparatus data encoded according to a second encoding format, different from the first encoding format, where the decoder at the first remote entity is incompatible with data encoded according to the second encoding format. When the control entity detects such an attempt, it enables a converter to convert data encoded according to the second encoding format received from the second remote entity into data encoded according to the first encoded format, and sends the data encoded according to the first encoded format to the first remote entity via the communication interface.

20 Claims, 2 Drawing Sheets

OTHER PUBLICATIONS

3GPP TS 28.062 V5.0.0 (Mar. 2002); 3rd Generation Partnership Project; Technical Specification Group Service and System Aspects; Inband Tandem Free Opteration (TFO) of speech codecs; Service Description; Stage 3 (Release 5).

Digital Cellular telecommunication system (phase 2+) (GSM); Universal Mobile Telecommunications System (UMTS); Inband Tandem Free Operation (TFO) of speech codecs; Service Descriptions; Stage 3 (3GPP TS 28.062 version 5.0.0. Release 5) ETSI TS 128 062 V5.0.0, Mar. 2002, pp. 14-19, 35-51, 56-59, 81-88, 164-168, XP 002248624 cited in the application section 4.2.1.

Partial International Search Report, PCT/CA03/00972, Nov. 3, 2003.

* cited by examiner

METHODS AND APPARATUS FOR DATA COMMUNICATION

FIELD OF THE INVENTION

The present invention relates generally to communications networks and, more particularly, to methods and apparatus for increasing the efficiency with which data is communicated between entities in such networks by using Tandem-Free Operation (TFO) or Transcoder-Free Operation (TrFO) protocols.

BACKGROUND OF THE INVENTION

According to most existing telecommunications standards, the transmission of speech information, in particular when transmitted over a wireless interface, takes the form of compressed speech parameters. Upon receipt of compressed speech parameters at a base station in communication with a mobile unit, the speech parameters are processed by a codec (coder/decoder), which converts (expands) the speech parameters into speech samples in order to provide compatibility with the public switched telephone network (PSTN). The speech samples are then transmitted over the PSTN.

If the other party is connected directly to the PSTN, such as via a wireline connection, the speech samples having traveled through the network will simply be converted into audio form by a digital telephone unit at the other party site. Of course, the other party may also be a second mobile unit, in which case the speech samples will terminate at a second base station, where a second codec re-converts the speech samples back into compressed speech parameters for transmission to the second mobile unit via a wireless interface. The usage of a source decoder to expand speech parameters into a stream of speech samples, in combination with the use of a destination encoder for re-compression of these samples into a second set of compressed speech parameters, is referred to as operation of codecs in tandem, or "tandem operation".

Those skilled in the art will appreciate that the tandem operation described above introduces a degradation in service quality, as errors may be introduced by the decompression and re-compression operations performed by the source and destination codecs, respectively. When the codec are compatible, such error should in principle be avoidable, as neither codec operation is required by virtue of the second base station requiring the compressed speech parameters rather than the expanded speech samples. Furthermore, the transmission of speech samples in an uncompressed format has greater bandwidth requirements than that of the compressed format.

A method for reducing the occurrence of tandem codecs, called Tandem-Free Operation (TFO), uses an in-band handshaking protocol to detect the presence of tandem codecs, and then bypasses the codecs to transmit the compressed speech parameters. This arrangement bypasses the requirement for decompression at the source codec and (re-) compression at the destination codec, which obviates the occurrence of errors at these two stages. As a result, a high quality of service can be achieved for a given end-to-end call between two mobile units.

A more recent approach, called Transcoder-Free Operation (TrFO), uses out-of-band signaling to detect call scenarios involving tandem codecs at call set-up time. Thereupon action is taken to put in place a direct end-to-end link to provide for a direct exchange of the compressed speech parameters without the involvement of network transcoders.

For information on the TFO and TrFO techniques, the reader is invited to refer to the following documents that are hereby incorporated by reference:

$3^{rd}$ generation partnership project, Technical specification group core network, Out of band transcoder control—Stage 2 (3GPP TS 23.153 V4.4.0 (2001–12));

$3^{rd}$ generation partnership project, Technical specification group core network, Bearer-independent circuit-switched core network, Stage 2 (3GPP TS 23.205 V4.4.0 (2002–03));

$3^{rd}$ generation partnership project, Technical specification group (TSG) RAN3, Transcoder free operation (3GPP TR 25.953 V4.0.0 (2001–03));

$3^{rd}$ generation partnership project, Technical specification group services and system aspects, Inband tandem free operation (TFO) of speech codecs, service description—Stage 3 (3GPP TS 28.062 V5.0.0 (2002–03)).

A deficiency of the above noted methods is that they require the source codec and the destination codec for each end of the communication path to be compatible. For example, with reference to FIG. 1, mobile module 800 and mobile unit 818 each make use of a respective codec type and codec types are incompatible with one another. Mobile module 800 communicates with gateway 804 and mobile module 818 communicates with gateway 808. If gateway 804 wants to establish a tandem free connection with gateway 808, gateway 804 starts a handshaking protocol and sends control messages to the gateway 808. This control information can be in the form of in-band signalling or in the form out-of-band signalling. Although a negotiation can take place between the gateways 804 and 808, a direct tandem free connection cannot be established because the mobiles 800 and 818 use incompatible encoders and decoders. Consequently, when the handshaking protocol determines that the codecs are incompatible the speech parameters are processed by the source codec (coder/decoder) in the gateway which converts (expands) the speech parameters into speech samples and are transmitted to the destination codec in the other gateway. Consequently, uncompressed speech samples are transmitted over communication link 806 which requires a greater amount of bandwidth than the transmission of compressed speech parameters. This increase in bandwidth requirement is undesirable.

Thus there exists a need in the industry for providing an improved communication apparatus that alleviates at least in part problems associated to the prior art.

SUMMARY OF THE INVENTION

According to a broad aspect, the invention provides a communication apparatus having a communication interface suitable for communicating with a first remote entity, the first remote entity including a decoder capable of decoding data encoded according to a first encoding format. The communication apparatus includes a control entity operative to detect an attempt by a second remote entity to establish a TFO connection with the communication apparatus via the communication interface, for sending to the first remote entity, data encoded according to a second encoding format, different from the first encoding format, where the decoder at the first remote entity is incompatible with data encoded according to the second encoding format. When the control entity detects such an attempt, it enables a converter to convert data encoded according to the second encoding format received from the second remote entity into data encoded according to the first encoded format, and sends the data encoded according to the first encoded format to the first remote entity via the communication interface.

Advantageously, the invention allows data to be transmitted in a compressed format between systems having incompatible codecs.

For the purpose of this description, the acronym "TFO" will be used to designate both tandem free operation methods and transcoder free operation methods. In cases where a distinction needs to be made between these two methods, the respective multiword descriptions will be used.

For the purpose of this specification, the expression TFO protocol refers to a protocol that includes the capability to establish a tandem free operation connection or a transcoder free operation connection. It should be expressly noted that "TFO protocol" does not necessarily imply that the application or use of the protocol necessarily leads to a tandem free operation connection or a transcoder free operation connection. "TFO protocol" encompasses protocols that, in addition to their capability to attempt a tandem free operation connection or a transcoder free operation connection, also provide for additional functionalities.

According to a second broad aspect, the invention further provides a method implementable at a communication apparatus having a communication interface for communicating with a first remote entity, the first remote entity including a decoder capable of decoding data encoded according to a first encoding format. The method includes detecting an attempt by a second remote entity to establish a TFO connection with the communication apparatus, for sending to the first remote entity, via the communication apparatus data encoded according to a second encoding format, different from the first encoding format, where the decoder at the first remote entity is incompatible with data encoded according to the second encoding format. When such an attempt is detected, the method includes enabling a converter to convert data encoded according to the second encoding format received from the second remote entity into data encoded according to the first encoded format, and sends the data encoded according to the first encoded format to the first remote entity.

According to a third broad aspect, the invention provides a computer readable storage medium containing a program element for execution by a processor on a data communication apparatus comprising a communication interface for communicating with a first remote entity, the first remote entity including a decoder capable of decoding data encoded according to a first encoding format. When executed, the program element implements a control entity operative to detect an attempt by a second remote entity to establish a TFO connection with the communication apparatus via the communication interface, for sending to the first remote entity, via the communication apparatus data encoded according to a second encoding format, different from the first encoding format, where the decoder at the first remote entity is incompatible with data encoded according to the second encoding format. When such an attempt is detected, the control entity enables a converter to convert data encoded according to the second encoding format received from the second remote entity into data encoded according to the first encoded format, and sends the data encoded according to the first encoded format to the first remote entity via the communication interface.

According to another broad aspect, the invention provides a system comprising a first gateway and a second gateway. The first gateway comprises a communication interface for communicating with a first remote entity, the first remote entity including a encoder capable of encoding data according to a first encoding format. The second gateway comprises a communication interface for communicating with a second remote entity, the second remote entity including a decoder capable of decoding data encoded according to a second encoding format. The second format is different from the first encoding format and the decoder at the second remote entity being incompatible with data encoded according to the first encoding format. The first gateway and second gateway are adapted for allowing an exchanged of data between the first remote entity and the second remote entity. The first gateway and second gateway are also adapted for initiating a handshake protocol whereby the first gateway acquires a first configuration. In the first configuration, the first gateway converts data encoded according to the first encoding format received from the first remote entity into data encoded according to the second encoded format. The first gateway forwards data according to the second encoded format to the second gateway. The second gateway is adapted to acquiring a second configuration. In the second configuration the second gateway forwards to the second remote entity data encoded according to the second encoding format received from the first gateway.

These and other aspects and features of the present invention will now become apparent to those of ordinary skill in the art upon review of the following description of specific embodiments of the invention in conjunction with the accompanying drawings.

Figure 1:
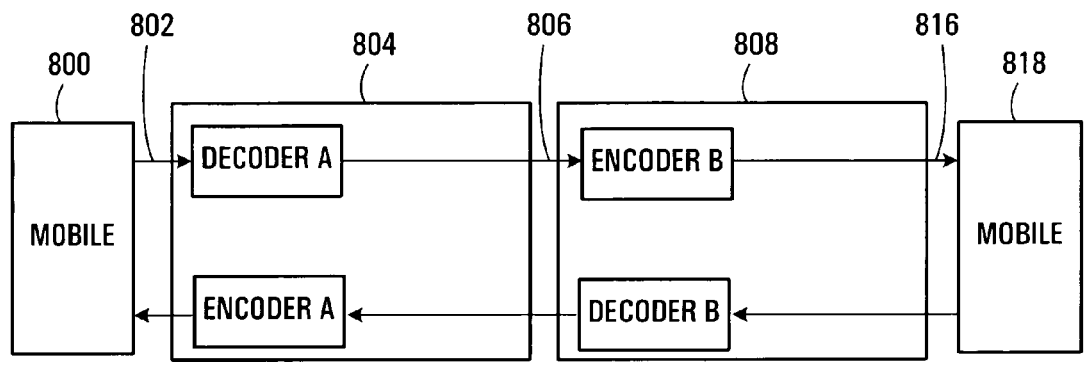
FIG. 1 is an arrangement of network elements prior to initiating TFO negotiations.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE PREFERRED EMBODIMENTS

Figure 2:
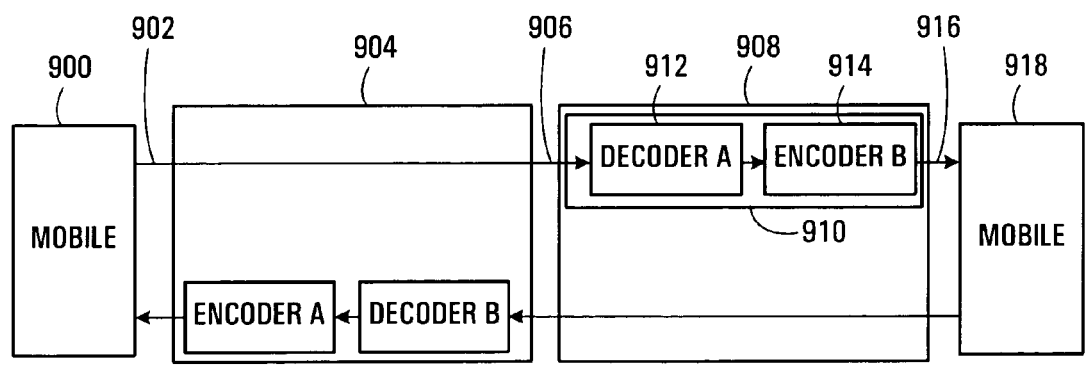
FIG. 2 is an arrangement of network elements in accordance with an example of implementation of the invention.

FIG. 2 illustrates an arrangement of network elements in accordance with an example of implementation of a first embodiment of the present inventive concept.

FIG. 2 shows a connection, established via communication apparatuses implemented as gateways that allow mobiles with incompatible codecs to interoperate. Mobile 900 compresses audio information by using a first encoder that outputs data encoded according to a first format. The encoded data is sent via a wireless connection 902 to gateway 904. The gateway 904 transmits the data without conversion over a connection 906 that can be effected at least in part over a packet-switched network to a gateway 908. It should be expressly noted that the connection 906 is not necessarily a packet switched connection and other types of connections can be used such as a circuit switched connection or a combination of a circuit-switched connection and a packet switched connection.

The gateway 908 includes a communication interface (not shown) via which the connections with other entities are established, and a control entity 910. The control entity 910 includes a converter comprising a decoder 912 and an encoder 914.

The gateway 908 establishes a wireless connection 916 via its communication interface with a second mobile 918 that has a decoder processing data encoded according to a second encoding format, different from the first encoding format. Stated otherwise, the decoder (not shown) of mobile 918 is incompatible with the encoder (not shown) of the mobile 900.

In a specific and non-limiting example, the gateways 904, 908 can be implemented in respective base stations of the network.

If gateway 904 wants to establish a TFO connection with gateway 908, gateway 904 starts a handshaking protocol and sends control messages to the gateway 908. This control information can be in the form of in-band signalling or in the form of out-of-band signalling. Although a TFO negotiation can take place between the gateways 904 and 908, a direct tandem free (TFO) connection cannot be established because the mobiles 900 and 918 use incompatible encoders and decoders. The gateway 908 provides a conversion function such that the mobile 918 can receive encoded data according to a format that the decoder [not shown] at the mobile 918 can process.

The control entity 910 of the gateway 908 monitors the control messages exchanged between the gateway 904 and the gateway 908, when the gateways 904 and 908 attempt establishing a tandem free connection. These control messages allow the gateways 904 and 908 to exchange encoder/decoder capability information, among other information normally used to set the tandem free connection. Since the control entity 910 receives those messages, the control entity 910 is aware of the encoder/decoder capabilities of both mobiles and consequently becomes aware that an incompatibility exists. To overcome the incompatibility problem, the control entity 910 invokes a converter, which has a decoder 912 and an encoder 914. Similarly gateway 904 disables its decoder (Decoder A). The function of the converter is to convert the data encoded according to the first format into data according to a second format, that the mobile 918 could process. The converter can operate according to the principles disclosed in U.S. Pat. No. 5,995,923 in the name of Mermelstein et al., issued on Nov. 30, 1999, the contents of which are hereby incorporated by reference. Alternatively, the decoder 912 converts the data encoded according to a first format into PCM samples and the PCM stream is input into encoder 914 that is of a type such as to output data encoded according to the second encoding format suitable for the decoder of the mobile 918.

The reader will appreciate that the TFO protocol used by the gateways 904, 908 can be based on a standard TFO protocol known in the art, modified or configured to allow the functionality described in this specification. The reader is also invited to refer to pending U.S. patent Ser. No. 10/235,959 filed Sep. 6, 2002 by R. Rabipour et al. whose contents are hereby incorporated by reference.

Although the drawings show that the control entity 910 has a single encoder and a single decoder, it is to be understood that the control entity 910 may have a collection of decoders and a collection of encoders, with logic allowing the control entity 910 to dynamically change configurations (build the converter) by pairing the appropriate decoder and the appropriate encoder such as to effect the necessary conversion. The decision about which encoder to associate with which decoder can be made in a variety of ways without departing from the spirit of the invention. One example is to use a compatibility table stored in a memory somewhere at the gateway 904 or even outside the gateway 908. The compatibility table indicates, for a given decoder at mobile 918 and a given encoder at mobile 900, which decoder 912 and encoder 914 to use such as to resolve the incompatibility. It will be appreciated that when the codec information is exchanged during the negotiation process, gateway 908 is made aware of which decoder 912 is used by 904 and should be logically relocated to 908. If the various encoders 914 and the various decoders 912 that can be selectively paired are embodied in hardware, a switch mechanism may be necessary at the control entity 910 such as to properly route the signals from the selected decoder 912 to the selected encoder 914 and therefore provide the correct configuration. On the other hand, if the various decoders 912 and the various encoders 914 are implemented in software, a logical switch mechanism may be used to insure that the data to be processed is routed as required for proper processing. An example of an apparatus that can associate encoders and decoders can be found in U.S. Pat. No. 6,324,515 in the name of Rabipour et al., the contents of which are incorporated herein by reference.

Although the above example is described in connection with a mobile-to-mobile call, the inventive concept applies to land-mobile and land-to-land calls using media compression. Accordingly, under those variants, the mobiles 900, 908 will be replaced by suitable terminating equipment with compression/decompression capability. Furthermore, the connections 902 and 916 do not have to be over the air interface, as it might be required by the specific application and may be over any suitable interface medium.

It should be expressly noted that the decoder and the encoder of the control entity 910 do not need to be separate entities and may be combined into one device, unit or module that effects the conversion from one encoding format to another encoding format.

In the embodiment described earlier, the control entity 910 includes the logic necessary to select the proper encoder and decoder such as to resolve the incompatibility between the mobiles 900 and 918. In a possible variant, this logic may be part of the mobile 918, or any other entity in the network that can communicate with the gateway 908 and instruct the gateway 908 as to which encoder and decoder to pair such as to provide the necessary conversion function. This variant assumes that such other entity receives the control messages exchanged between the gateways 904 and 908.

The gateway 904, used to handle the audio information sent from the mobile 918 to the mobile 900 is constructed and operates in the same fashion as the gateway 908, and for this reason it will not be described any further.

The reader will appreciate that the main benefit of the arrangement shown at FIG. 2 is to provide a bandwidth reduction over the connection 906 by allowing encoded data to be sent instead of PCM samples. Objectively, there may be no optimal tandem free operation connection established when the control entity 910 decodes and then re-encodes the media stream.

Figure 3:
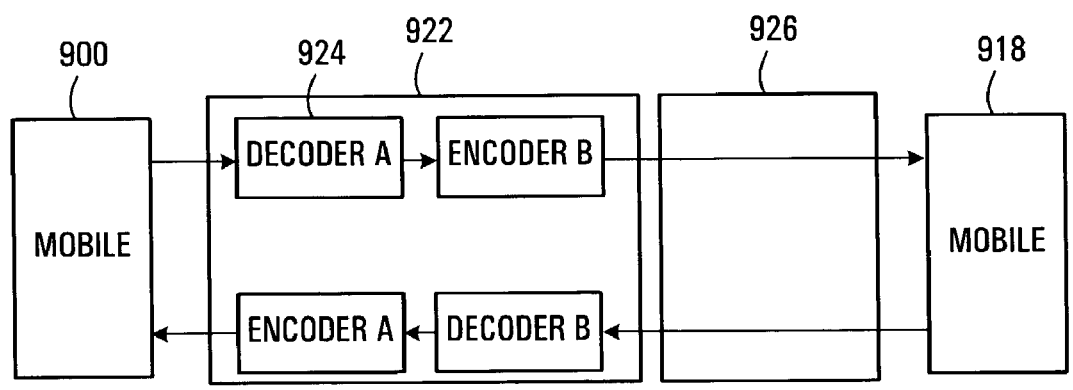
FIG. 3 is a variant of the configuration shown at FIG. 2.

FIG. 3 illustrates a variant of the embodiment shown at FIG. 2. In FIG. 3, a single gateway 922 combines the functions of the gateways 904 and 908 of the embodiment shown at FIG. 2.

Figure 4:
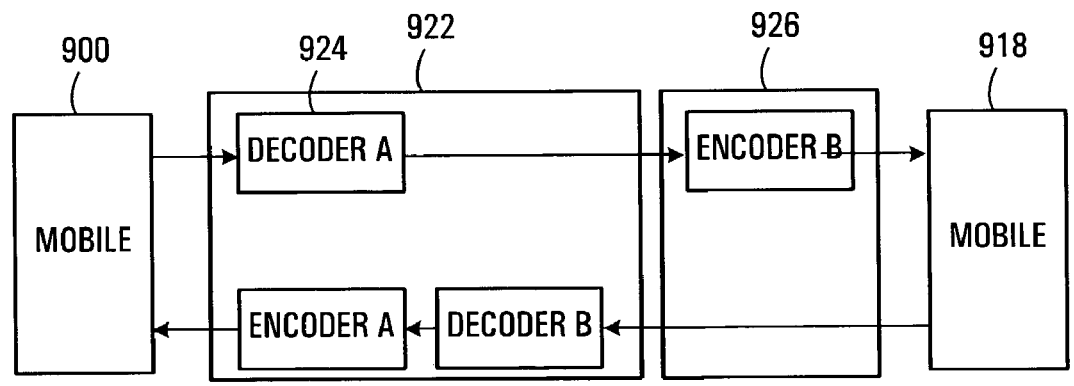
FIG. 4 is yet another variant of the configuration shown at FIG. 2.

FIG. 4 illustrates yet another variant in which the communication between the mobiles is of asymmetric nature. More specifically, the gateway 922 includes in the communication path from the mobile 900 to the mobile 918 a decoder 924 converting the data encoded according to the first format into PCM samples, and sending those to gateway 926 where they are encoded according to the second encoding format and then sent to mobile 918. In the reverse direction, the media stream is handled differently. The conversion from the second format to the first format is effected at once in the gateway 922, as described in connection with the embodiment of FIG. 2.

Optionally, the control entity 910 may be adapted to select either one of the configurations shown in FIGS. 2, 3 and 4 on the basis of desired criteria. Such criteria may include for example, load balancing requirements between the gateways, bandwidth management requirements and availability of the desired encoders/decoders at the respective gateways amongst others. In a non-limiting example, the configuration depicted in FIG. 2 may be selected when load balancing between the gateways 904 and 908 is desired and when each gateway has the required encoder/decoder pair. In another non-limiting example, the configuration depicted in FIG. 3 may be selected when the gateway associated with mobile 918 does not have the required encoder/decoder pair or when the gateway associated with mobile 918 does not have sufficient computational capabilities. In a non-limiting example, the configuration depicted in FIG. 4 may be selected when the bandwidth requirement between the gateways 904 and 908 is uneven depending on the direction of transmission and one of the paths has a greater amount of bandwidth available.

It should be appreciated that the type of media that can be used in the configurations described above can be audio information, video information or in general any data that can be compressed.

It will also be appreciated that the functional elements of the gateways 904, 908 described above may be implemented as an arithmetic and logic unit (ALU) having access to a code memory, which stored program instructions for the operation of the ALU. The program instructions could be stored on a medium which is fixed, tangible and readable directly by the gateway 904, 908, (e.g., removable diskette, CD-ROM, ROM, or fixed disk), or the program instructions could be stored remotely but transmittable to the gateway 904, 908 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art will further appreciate that in some embodiments of the invention, the functionality of the gateways 904, 908 may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

We claim:

1. A communication apparatus, comprising:
   a) a communication interface for communicating with a first remote entity, the first remote entity including a decoder capable of decoding data encoded according to a first encoding format;
   b) a control entity operative to detect an attempt by a second remote entity to establish a TFO connection with said communication apparatus via said communication interface, for sending to the first remote entity, via said communication apparatus data encoded according to a second encoding format, different from the first encoding format, the decoder at the first remote entity being incompatible with data encoded according to the second encoding format, said control entity detecting an attempt by the second remote entity to establish a TFO connection by monitoring control messages sent by the second remote entity to said communication apparatus;
   c) in response to the detecting, said control entity enabling a converter to convert data encoded according to the second encoding format received from the second remote entity into data encoded according to the first encoded format, and sending the data encoded according to the first encoded format to the first remote entity via said communication interface.

2. A communication apparatus as defined in claim 1, wherein the control messages are in-band messages sent by the second remote entity.

3. A communication apparatus as defined in claim 2, wherein the data sent by the second remote entity is in the form of a media stream.

4. A communication apparatus as defined in claim 3, wherein the media stream includes audio information.

5. A communication apparatus as defined in claim 4, wherein the media stream includes video information.

6. A communication apparatus as defined in claim 4, wherein said communication apparatus communicates with the first remote entity via a wireless connection.

7. A communication apparatus as defined in claim 6, wherein the first remote entity is a mobile.

8. A communication apparatus as defined in claim 4, wherein the second remote entity is a gateway.

9. A communication apparatus as defined in claim 8, wherein said communication apparatus communicates with the gateway via a packet-switched network.

10. A communication apparatus as defined in claim 4, wherein said converter processes the data encoded according to the second encoding format with a decoder following by processing by an encoder.

11. A communication apparatus as defined in claim 10, wherein said encoder outputs data encoded according to the first format.

12. A communication apparatus as defined in claim 10, wherein said control entity is operative to enable a decoder selected among a plurality of decoders, and enables an encoder selected among a plurality of encoders to associate the selected decoder and the selected encoder to form said converter.

13. A communication apparatus, comprising:
   a) a communication interface means for communicating with a first remote entity, the first remote entity including a decoder capable of decoding data encoded according to a first encoding format;
   b) a control means operative to detect an attempt by a second remote entity to establish a TFO connection with said communication apparatus via said communication interface means, for sending to the first remote entity, via said communication apparatus data encoded according to a second encoding format, different from the first encoding format, the decoder at the first remote entity being incompatible with data encoded according to the second encoding format, said control means detecting an attempt by the second remote entity to establish a TFO connection by monitoring control messages sent by the second remote entity to said communication apparatus;

c) in response to the detecting, said control means enabling converter means to convert data encoded according to the second encoding format received from the second remote entity into data encoded according to the first encoded format, and sending the data encoded according to the first encoded format to the first remote entity via said communication interface means.

14. A method implementable at a communication apparatus having a communication interface for communicating with a first remote entity, the first remote entity including a decoder capable of decoding data encoded according to a first encoding format, said method comprising:

a) detecting an attempt by a second remote entity to establish a TFO connection with the communication apparatus, for sending to the first remote entity, via the communication apparatus, data encoded according to a second encoding format, different from the first encoding format, the decoder at the first remote entity being incompatible with data encoded according to the second encoding format, the detecting of an attempt by the second remote entity to establish a TFO connection being effected by monitoring control messages sent by the second remote entity to said communication apparatus;

b) in response to the detecting, enabling a converter to convert data encoded according to the second encoding format received from the second remote entity into data encoded according to the first encoded format and sending the data encoded according to the first encoded format to the first remote entity.

15. A method as defined in claim 14, wherein the control messages are in-band messages.

16. A method as defined in claim 14, wherein the data sent by the second remote entity is in the form of a media stream.

17. A method as defined in claim 16, wherein the media stream includes audio information.

18. A computer readable storage medium containing a program element for execution by a processor on a data communication apparatus comprising a communication interface for communicating with a first remote entity, the first remote entity including a decoder capable of decoding data encoded according to a first encoding format, when executed said program element implementing a control entity operative to detect an attempt by a second remote entity to establish a TFO connection with the communication apparatus via said communication interface, for sending to the first remote entity, via said communication apparatus data encoded according to a second encoding format, different from the first encoding format, the decoder at the first remote entity being incompatible with data encoded according to the second encoding format, said control entity detecting an attempt by the second remote entity to establish a TFO connection by monitoring control messages sent by the second remote entity to the communication apparatus, in response to the detecting said control entity enabling a converter to convert data encoded according to the second encoding format received from the second remote entity into data encoded according to the first encoded format and send the data encoded according to the first encoded format to the first remote entity via the communication interface.

19. A system comprising:

a) a first gateway comprising a communication interface for communicating with a first remote entity, the first remote entity including a encoder capable of encoding data according to a first encoding format;

b) a second gateway comprising a communication interface for communicating with a second remote entity, the second remote entity including a decoder capable of decoding data encoded according to a second encoding format, the second format being different from the first encoding format, the decoder at the second remote entity being incompatible with data encoded according to the first encoding format;

c) said first gateway and second gateway being adapted for allowing an exchange of data between the first remote entity and the second remote entity, said first gateway and second gateway being adapted for initiating a handshake protocol whereby:

i) said first gateway is adapted for:

(1) acquiring a first configuration whereby said first gateway is enabled to convert data encoded according to the first encoding format received from the first remote entity into data encoded according to the second encoded format;

(2) forwarding data according to the second encoded format to the second gateway;

ii) said second gateway is adapted for acquiring a second configuration whereby said second gateway is enabled to forward to the second remote entity data encoded according to the second encoding format received from the first gateway.

20. A system comprising:

a) a first gateway comprising a communication interface for communicating with a first remote entity, the first remote entity including a decoder capable of decoding data according to a first encoding format;

b) a second gateway comprising a communication interface for communicating with a second remote entity, the second remote entity including an encoder capable of encoding data encoded according to a second encoding format, the second format being different from the first encoding format, the decoder at the first remote entity being incompatible with data encoded according to the second encoding format;

c) said first gateway and second gateway being adapted for allowing an exchange of data between the first remote entity and the second remote entity, said first gateway and second gateway being adapted for initiating a handshake protocol whereby:

i) said second gateway is adapted for:

(1) acquiring a first configuration whereby said second gateway is enabled to forward to the first gateway data encoded according to the second encoding format received from the second remote entity;

ii) said first gateway is adapted for:

(1) acquiring a second configuration whereby said first gateway is enabled to convert data encoded according to the second encoding format received from the second gateway into data encoded according to the first encoded format;

(2) forwarding data according to the first encoded format to the first remote entity.

* * * * *